(12) United States Patent
Tokutake

(10) Patent No.: US 9,904,314 B2
(45) Date of Patent: Feb. 27, 2018

(54) DEVICE AND METHOD OF CONTROLLING A DISPLAY PANEL BASED ON COVER-RELATED INFORMATION

(71) Applicant: Sony Corporation, Tokyo (JP)

(72) Inventor: Kenji Tokutake, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 640 days.

(21) Appl. No.: 14/275,669

(22) Filed: May 12, 2014

(65) Prior Publication Data

US 2015/0323963 A1 Nov. 12, 2015

(51) Int. Cl.
| | |
|---|---|
| *G06F 1/16* | (2006.01) |
| *G06F 3/041* | (2006.01) |
| *G09G 5/00* | (2006.01) |
| *G06F 3/0488* | (2013.01) |
| *G06F 3/039* | (2013.01) |
| *G06F 3/044* | (2006.01) |

(52) U.S. Cl.
CPC .............. *G06F 1/16* (2013.01); *G06F 1/1643* (2013.01); *G06F 1/1677* (2013.01); *G06F 3/039* (2013.01); *G06F 3/0412* (2013.01); *G06F 3/0416* (2013.01); *G06F 3/0488* (2013.01); *G09G 5/00* (2013.01); *G09G 5/003* (2013.01); *G06F 3/044* (2013.01); *G09G 2320/08* (2013.01); *G09G 2340/0464* (2013.01); *G09G 2354/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 2013/0147753 | A1* | 6/2013 | Griffin | G06F 3/0416 345/174 |
| 2013/0176257 | A1* | 7/2013 | Park | G06F 3/01 345/173 |
| 2014/0139477 | A1* | 5/2014 | Immonen | G06F 3/044 345/174 |
| 2014/0240253 | A1* | 8/2014 | Choi | G06F 3/044 345/173 |

FOREIGN PATENT DOCUMENTS

JP  2007-207107 A  8/2007

* cited by examiner

*Primary Examiner* — Robin Mishler
(74) *Attorney, Agent, or Firm* — Oblon, McClelland, Maier, Neustadt, L.L.P.

(57) ABSTRACT

A device includes a display configured to display an interface, wherein the display includes one or more touch sensors configured to detect a touch operation on an operating surface of the display. The device includes a cover that includes one or more projections arranged on a surface of the cover that opposes the operating surface of the display when the cover is in a closed position. The device includes circuitry configured to determine when the cover is in an open position and the closed position; determine, based on an output generated by the one or more touch sensors, an arrangement position of the one or more projections; and control, when the cover is determined to be in the closed position, the display based on the determined arrangement position of the one or more projections.

18 Claims, 11 Drawing Sheets

DEVICE AND METHOD OF CONTROLLING A DISPLAY PANEL BASED ON COVER-RELATED INFORMATION

BACKGROUND

Technical Field

The present disclosure relates to the control of a display panel based on information related to a cover attached to a device that includes the display panel.

Description of Related Art

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly nor impliedly admitted as prior art against the present disclosure.

Protective covers may be attached to portable electronic devices for the purpose of protecting the devices from physical shock, abrasion, etc. For example, a portable terminal device such as a smartphone or a tablet may include a cover that protects the device's touch screen from scratching or cracking. These protective covers may be attached to a corresponding terminal device such that the cover can be open or closed depending on the usage state. For example, when the device is in use, the cover may be opened such that the touch panel is accessible. Similarly, when the device is not in use, the cover may be closed such that the touch panel is protected while the device is stored. These protective covers are frequently formed in a shape corresponding to the terminal device to which they are to be attached. In some cases, access to a graphical user interface (GUI) displayed on the touch panel display may be provided via a window formed in the cover.

SUMMARY

Numerous protective covers of varied styles, material, etc., are available for protecting corresponding terminal devices to which the covers may be attached. However, there exists a problem in that the terminal device was previously incapable of determining features related to the cover and controlling the device's display based on the determined features related to the cover.

In one or more embodiments, a device according to the present disclosure includes a display configured to display an interface, wherein the display includes one or more touch sensors configured to detect a touch operation on an operating surface of the display. The device includes a cover that includes one or more projections arranged on a surface of the cover that opposes the operating surface of the display when the cover is in a closed position. The device includes circuitry configured to determine when the cover is in an open position and the closed position; determine, based on an output generated by the one or more touch sensors, an arrangement position of the one or more projections; and control, when the cover is determined to be in the closed position, the display based on the determined arrangement position of the one or more projections.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
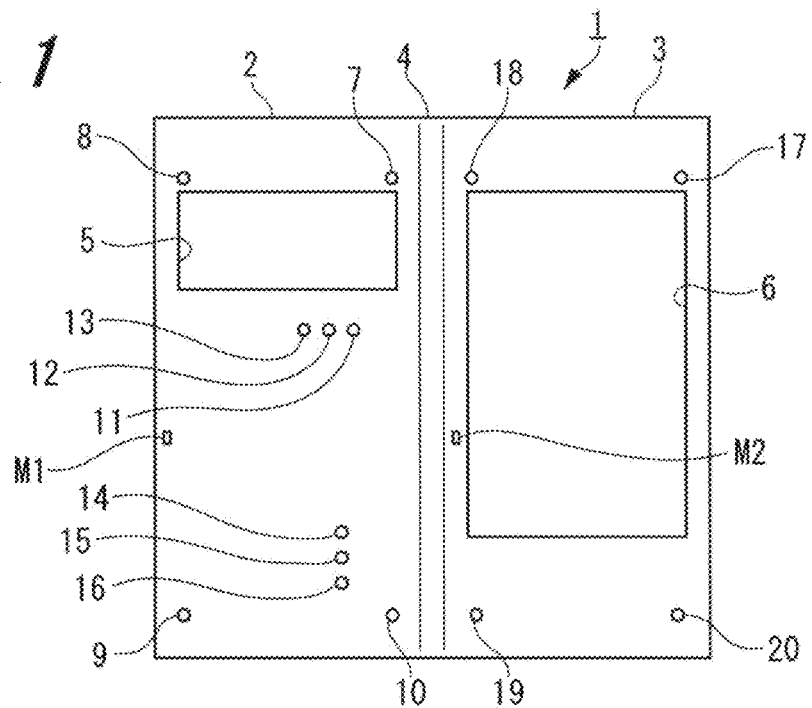
FIG. 1 illustrates a non-limiting example of a terminal device cover, according to certain embodiments.

Referring now to the drawings, wherein like reference numerals designate identical or corresponding parts throughout the several views.

FIG. 1 illustrates a non-limiting example of a terminal device cover, according to certain embodiments. In the example of FIG. 1, an inner surface of a cover 1 is shown. The exemplary cover 1 includes a first member 2, a second member 3, and a connection part 4 between the first member 2 and the second member 3. The connection part 4 is connectable to a corresponding terminal device to which the cover 1 may be attached. For example, the connection part 4 may be affixed to a corresponding terminal device such that the inner surfaces of the first member 2 and the second member 3, as shown in FIG. 1, oppose an operating surface of a touch panel included in the corresponding terminal device to which the cover 1 is attached. In certain embodiments, the first member 2 and the second member 3 may have a shape corresponding to a shape of the terminal device to which the cover 1 is attached. However, a cover in accordance with the present disclosure may be of any arbitrary shape and is not limited to any particular shape, size, etc.

The first member 2 includes a relatively small window 5 formed in an upper portion of the first member 2. The window 5 may be provided in the cover 1 such that a user may view a display included in a terminal device when the first member 2 is in the closed position (i.e. the first member 2 covers at least a portion of a touch panel display on the corresponding terminal device to which the cover 1 is attached). Moreover, the first member 2 includes projections 7 through 10, which are arranged at various positions on the inner surface of the first member 2. In certain embodiments, the projections 7 through 10 may be arranged on the first member 2 for providing a position arrangement confirmation of the first member 2 with respect to a touch panel display included on the terminal device to which the cover 1 is attached. In the example of FIG. 1, the projections 7 through 10 are arranged respectively at the four corners of the first member 2. However, other arrangements of the projections 7 through 10 may be implemented in other embodiments.

As a non-limiting example of a positional arrangement confirmation that may be determined based on the arrangement of the projections 7 through 10, processing circuitry included in the terminal device to which the cover 1 is attached may determine, based on a detected arrangement position of the projections 7 through 10, a positional arrangement of the cover 1 with respect to a touch panel display included in the terminal device, as well as a determination of a misalignment between the first member 2 and the touch panel display. Moreover, in certain embodiments, the processing circuitry of the terminal device may correct the misalignment between the first member 2 and the touch panel display based on the determined misalignment between the two elements. Additional processing corresponding to the positional relationship determination and misalignment detection and correction will be discussed in detail in later paragraphs.

The first member 2 includes projections 11 through 16 arranged at various positions on the inner surface of the first member 2. In certain embodiments, a positional arrangement of the projections 11 through 16 may correspond to descriptive information corresponding to the cover 1. For example, processing circuitry included in a terminal device to which the cover 1 is touched may determine a positional arrangement of the projections 11 through 16 with respect to a touch panel display included in the terminal device. Based on a determined positional arrangement of the projections 11 through 16, the processing circuitry may determine various features of the cover 1 such as a material, a thickness, a size, a window position, a window arrangement, a touch sensitivity setting, etc. Processing related to the determination of various information related to the cover 1 based on the arrangement position of projections inside the cover 1 will be discussed in great detail in later paragraphs.

The first member 2 additionally includes a magnet M1. In certain embodiments, the magnet M1 may be detected by circuitry included in a terminal device to which the cover 1 is attached. For example, the detected presence of the magnet M1 with respect to the terminal device may provide an indication that the cover 1, and specifically the first member 2, is in the closed position. In certain implementations, a Hall integrated circuit (IC) may be included in the terminal device for detecting the presence of the magnet M1 such that an open/closed position determination of the first member 2 may be performed by the processing circuitry of the terminal device. In certain embodiments, a determination as to the open and closed state of the cover 1 may be performed by other methods which may or may not include implementations using a magnet such as magnet M1. For example, processing circuitry included in the terminal device to which the cover 1 is attached may determine that the first member 2 in the closed state based on a detection of at least one of the projections 7 through 16 contacting an operating surface of a touch panel included in the terminal device.

Referring now to the second member 3 of the cover 1 shown in FIG. 1, a comparatively large window 6 is formed in the second member 3. As discussed above for the window 5, the window 6 may provide an opening through which a user may view a display included in a terminal device to which the cover 1 is attached when the second member 3 is in a closed position. The second member 3 includes projections 17 through 20, which are arranged respectively at the four corners of the second member 3 in this example. In certain embodiments, the projections 17 through 20 may be detected by processing circuitry included in the terminal device to which the cover 1 is attached such that a position confirmation of the second member 3 with respect to the terminal device may be performed, similar to the case discussed above for the projections 7 through 10. For example, an arrangement position of the projections 17 through 20 may be determined based on a touch sensor output of a touch panel included in the terminal device to which the cover 1 is attached, and the processing circuitry of the terminal device may determine a position of the second member 3 with respect to the terminal device, as well as a misalignment between the second member 3 and the touch panel display.

In certain embodiments, the second member 3 may include one or more projections for determining information related to the cover 1, similar to the projections 11 through 16 discussed above with respect to the first member 2. However, such projections for determining information related to the cover 1 are omitted for simplicity in the example of FIG. 1.

The second member 3 also includes a magnet M2, which performs a similar function as the magnet M1 discussed above for the first member 2. For example, a Hall IC may detect a presence of a magnetic field when the magnet M2 is in close proximity to the Hall IC, and the Hall IC may output a signal to processing circuitry for determining an open and closed state of the second member 3 with respect to the terminal device to which the cover 1 is attached.

Regarding the projections 7 through 20 illustrated in FIG. 1 and discussed above, the projections in certain embodiments may be composed of an electrically conductive material such that sensors included in a touch panel display of a terminal device to which the cover 1 is attached may detect the presence and an arrangement position of the various projections. Moreover, while the projections 7 through 20 are described herein as "projections," the present disclosure is not limited to implementations in which the various projections described herein are physically raised from a surface of the cover 1. For example, an electrically conductive material may be embedded within the first member 2 and the second member 3 at the various positions illustrated in FIG. 1, and sensors included in a touch panel display of the terminal device to which the cover 1 is attached may detect the presence of the electrically conductive material and the arrangement position of the various embedded electrically conductive materials within the cover 1 such that processing related to the positional confirmation and the determination of information related to the cover 1 may be performed. However, this process does not require the projections physically contacting the touch panel display, but instead the touch sensors (e.g., electrostatic capacitance sensors) may detect the projections within a suitable proximity range relative to the sensors. Therefore, the term "projection" as used in the present disclosure may refer to both of a material that is physically raised from a surface of the cover 1, as well as a material that is embedded within the surface of the cover 1.

Figure 2:
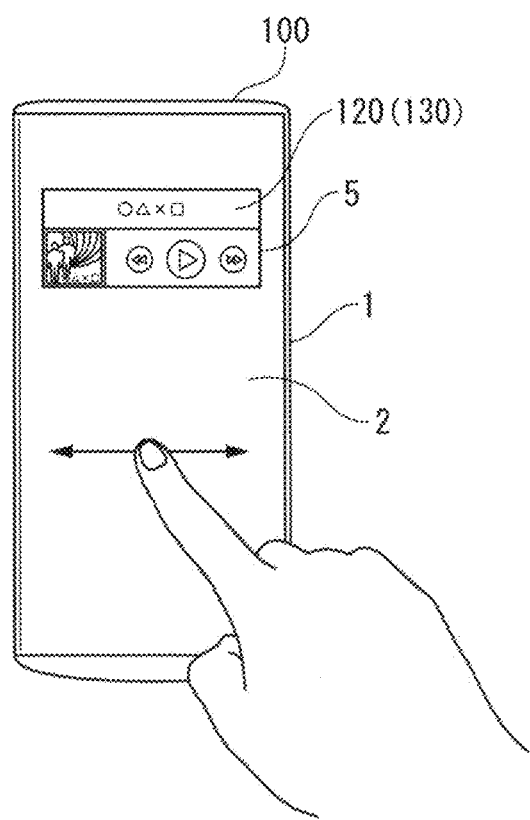
FIG. 2 illustrates a non-limiting example of a terminal device and a corresponding cover that includes a relatively small window, according to certain embodiments.

Next, FIG. 2 illustrates an example in which the cover 1 is attached to an exemplary terminal device 100. The example of FIG. 2 demonstrates a case in which the first member 2 of the cover 1 is in a closed position such that the user may view a display 120 integrated with a touch panel 130 through the window 5. It is assumed for this example that the connection part 4 is attached to an edge of the terminal device 100 such that the second member 3 is arranged at a back surface of the terminal device 100, which may also include a touch panel display. In the example of FIG. 2, an interface for controlling a music application executed by the processing circuitry of the terminal device 100 is displayed on the display 120, which is viewable through the window 5. The exemplary graphical user interface (GUI) illustrated in FIG. 2 includes touch panel display control buttons corresponding to rewind, play, and fast forward features, as well as an image of a currently playing musical artist. As will be discussed later, in certain embodiments, the processing circuitry of the terminal device 100 may control the content, display position, display size, etc., of the graphical user interface output on the display 120 based on a positional arrangement of the various projections included on the inner surface of the first member 2.

In addition, in certain embodiments, in the state in which the cover 1 is attached to the terminal device as shown in FIG. 2, the one or more touch sensors included in the touch panel 130 may detect a touch operation performed on a surface of the first member 2. That is, rather than detecting touch operations only performed on the operating surface of the touch panel display, the one or more touch sensors may detect a touch operation performed on an outer surface of the first member 2 when the first member 2 is in the closed position (i.e. the first member 2 covers the display 120 such that the touch panel 130 detects the touch operation through the cover 1). Moreover, in order to enable processing to be executed based on touch operations performed with respect to the cover 1, the terminal device 100 may store instructions for executing processing based on touch operations performed in an area outside of the display area corresponding to the window 5. That is, in addition to the interface provided in the display area corresponding to the window 5, the surface of the cover 1 may also serve as an interface for controlling aspects of the terminal device 100 by performing touch operations directly on the surface of the cover 1. Accordingly, while only the display area corresponding to the window 5 is viewable in the example of FIG. 2 where the first member 2 is in the closed position, the one or more touch sensors of the touch panel 130 that are outside of the region corresponding to the display area of window 5 may also be in an active state when the first member 2 is in the closed position.

Figure 3:
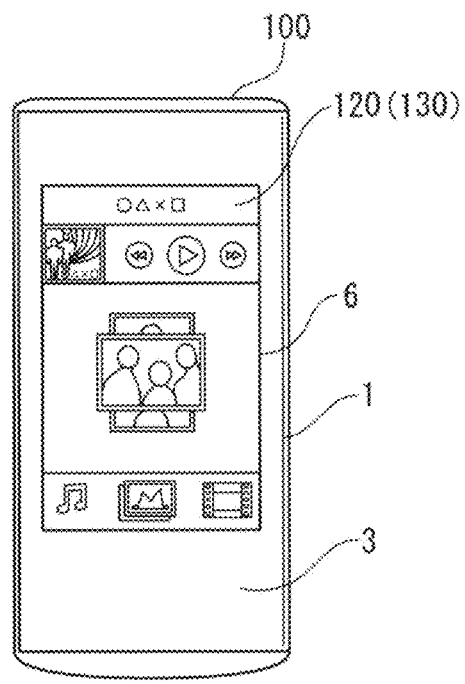
FIG. 3 illustrates a non-limiting example of a terminal device and a corresponding cover that includes a relatively large window, according to certain embodiments.

Next, FIG. 3 illustrates another non-limiting example of the cover 1 attached to the exemplary terminal device 100. In the example of FIG. 3, the second member 3 of the cover 1 illustrated in the closed position such that an interface displayed on the display 120 is viewable through the relatively larger window 6. The example of FIG. 3 may represent a case in which the view shown in FIG. 2 is reversed such that the back surface of the terminal device 100 is viewable in FIG. 3. However, it should be noted that the present disclosure is not limited to providing display panels on opposing surfaces of terminal device and further is not limited to covers in which both a first member and a second member are implemented. As shown in FIG. 3, the relatively large window 6 provides for an increased viewing size of the music application interface displayed on the display 120. In this example, the music application interface includes the control buttons that were included in the interface illustrated in FIG. 2, as well as additional image data corresponding to the music and various control icons for selecting other interfaces that may be displayed on the display 120.

Figure 4:
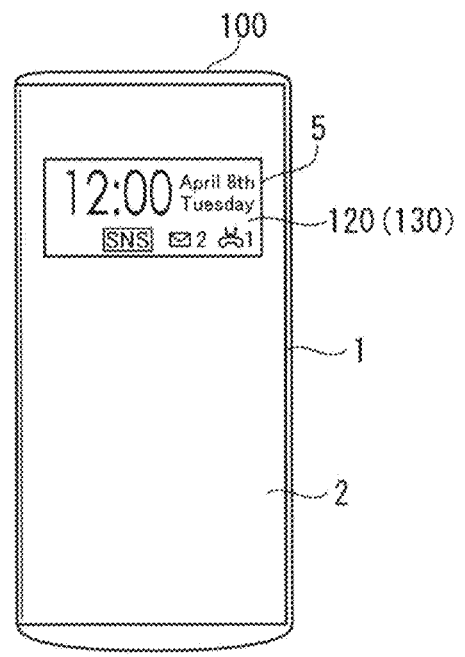
FIG. 4 illustrates another non-limiting example of a terminal device and a corresponding cover that includes a relatively small window, according to certain embodiments.

Next, FIG. 4 illustrates another non-limiting example in which the cover 1 is attached to the exemplary terminal device 100. The state of the terminal device 100 and the cover 1 in FIG. 4 is similar to the example discussed above and illustrated in FIG. 2. However, in contrast to the example of FIG. 2, a different interface is displayed on the display 120. Specifically, the interface displayed on the display 120 and viewable through the window 5 includes an indication of a current time, current date, missed calls, emails received, and a social networking service (SNS) application icon. As will be discussed later in detail, the content and the display features of the interface output on the display 120 may be controlled based on the positional arrangement of the various projections included on the inner surface of the cover 1.

Figure 5:
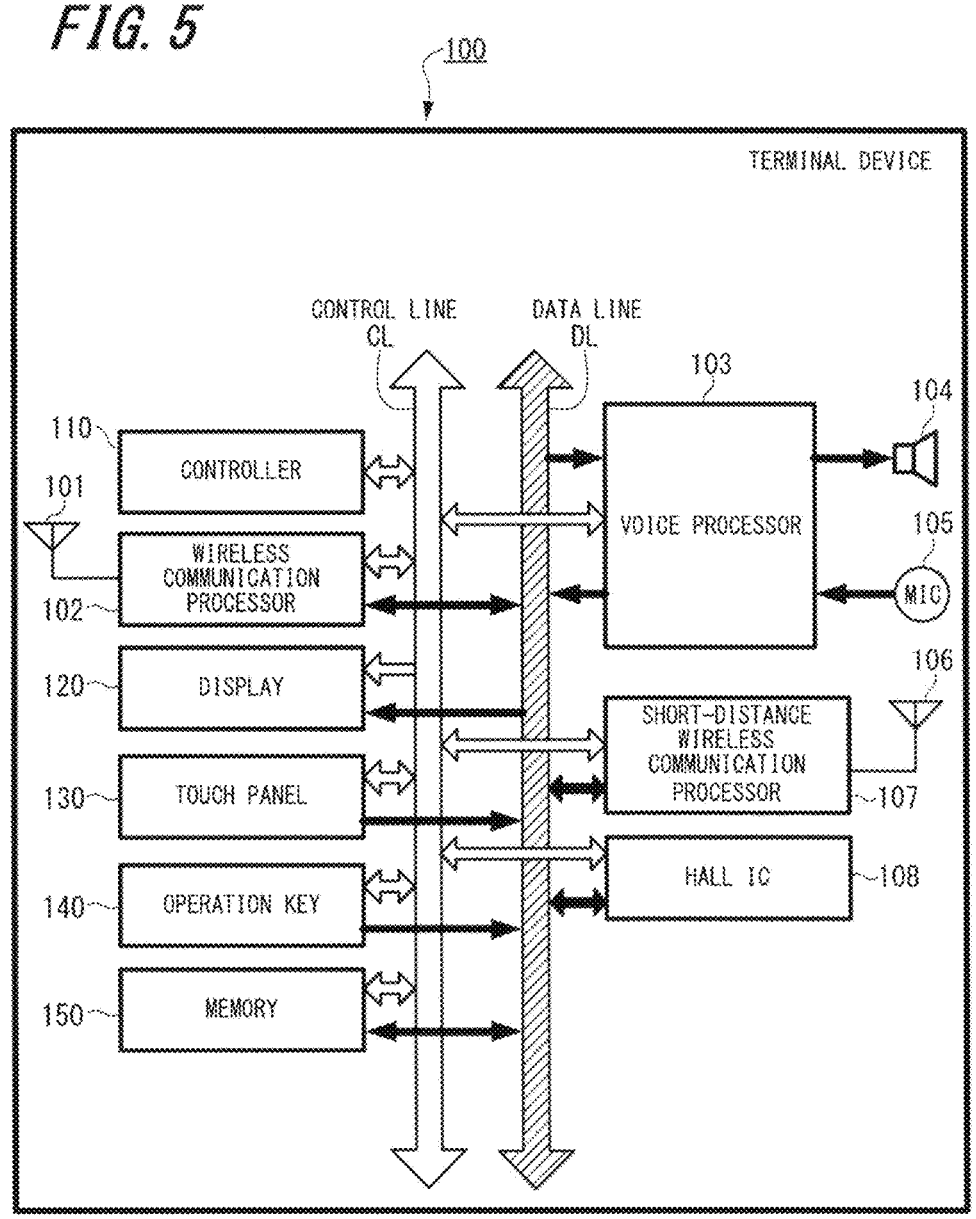
FIG. 5 illustrates a non-limiting exemplary block diagram corresponding to an internal structure of a terminal device, according to certain embodiments.

Next, FIG. 5 illustrates a block diagram for an exemplary terminal device, according to certain embodiments of the present disclosure. For simplicity, the terminal device illustrated in FIG. 5 is implemented as a mobile phone terminal device (e.g., a smartphone) in examples described herein. However, the skilled artisan will appreciate that the processing described herein may be easily adapted for other types of devices (e.g. a tablet device, an e-reader, a portable gaming device, a wearable device, etc.).

Referring now to FIG. 5, the exemplary terminal device 100 of FIG. 5 includes a controller 110, a wireless communication processor 102 connected to an antenna 101, a voice processor 103, a speaker 104, a microphone 105, a short-distance wireless communication processor 107 connected to an antenna 106, a Hall IC 108, a display 120, a touch panel 130, an operation key 140, and a memory 150.

The antenna 101 transmits/receives electromagnetic wave signals between base stations for performing radio-based communication, such as the various forms of cellular telephone communication.

The wireless communication processor 102 controls communications performed between the terminal device 100 and other external devices via the antenna 101. For example, the wireless communication processor 102 may control communication between base stations for cellular telephone communication.

The voice processor 103 demodulates and/or decodes the audio data read from the memory 150, or audio data received by the wireless communication processor 102 and/or short-distance wireless communication processor 107. Additionally, the voice processor 103 may decode audio signals received from the microphone 105.

The speaker 104 emits an audio signal corresponding to audio data supplied from the voice processor 103.

The microphone 105 detects surrounding audio, and converts the detected audio into an audio signal. The audio signal may then be output to the voice processor 103 and/or the controller 110 for further processing.

In embodiments in which the terminal device 100 does not include voice call functionality (or other functionality related to the input and output of audio signals, including voice), the voice processor 103, speaker 104, and microphone 105 may be omitted.

The antenna 106 may transmit/receive electromagnetic wave signals to/from other external apparatuses, and the short-distance wireless communication processor 107 may control the wireless communication performed with the other external apparatuses. Bluetooth, IEEE 802.11, and near field communication (NFC) are non-limiting examples of wireless communication protocols that may be used for inter-device communication via the short-distance wireless communication processor 107.

The controller 110 may include one or more central processing units (CPUs), and may control each element in the terminal device 100 to perform features related to communication control, audio signal processing, control for the audio signal processing, image processing and control, and other kinds of signal processing. In certain embodiments, the controller 110 may perform processing related to the control of the display 120 and/or the touch panel 130 based on determined features of a protective cover. In certain embodiments, the controller 110 may perform processing related to the control of a detection sensitivity corresponding to the touch panel 130 based on determined features of a protective cover. The controller 110 may perform these features by executing instructions stored in the memory 150. Alternatively or in addition to the local storage of the memory 150, the features may be executed using instructions stored in an external device accessed on a network or on a non-transitory computer readable medium.

The display 120 may be a liquid crystal display (LCD), an organic electroluminescence display panel, or another display screen technology. In addition to displaying still and moving image data, the display 120 may display operational inputs, such as numbers or icons, which may be used for control of the terminal device 100. The display 120 may additionally display a graphical user interface with which a user may control aspects of the terminal device 100. Further, the display 120 may display characters and images received by the terminal device 100 and/or stored in the memory 150 or accessed from an external device on a network. For example, the terminal device 100 may access a network such as the Internet and display text and/or images transmitted from a Web server.

The touch panel 130 may include a physical touch panel display screen and a touch panel driver. The touch panel 130 may include one or more touch sensors for detecting an input operation on an operating surface of the touch panel display screen. Used herein, the phrasing "touch operation" refers to an input operation performed by touching an operating surface of the touch panel display with an instruction object, such as a finger or stylus-type instrument. In the case where a stylus, or the like, is used in a touch operation, the stylus may include a conductive material at least at the tip of the stylus such that the sensors included in the touch panel 130 may detect when the stylus approaches/contacts the operating surface of the touch panel display (similar to the case in which a finger is used for the touch operation).

In one or more embodiments, the touch panel 130 may be disposed adjacent to the display 120 (e.g., laminated), or may be formed integrally with the display 120. The display 120 and the touch panel 130 may be surrounded by a protective casing, which may also enclose the other elements included in the terminal device 100. Additionally, the protective casing may be capable of accepting a protective cover such as the various covers described in the present disclosure. For simplicity, exemplary embodiments described herein assume that the touch panel 130 is formed integrally with the display 120 and therefore, the examples may interchangeably describe touch operations being performed with respect to the display 120 or the touch panel 130.

In one or more embodiments, the touch panel 130 is a capacitance-type touch panel technology. In other embodiments, the touch panel 130 may be implemented using other touch panel types with alternative structures, such as resistance-type touch panels. In certain embodiments, the touch panel 130 may include transparent electrode touch sensors arranged in the x/y direction on the surface of transparent sensor glass.

The touch panel driver may be included in the touch panel 130 for control processing related to the touch panel 130, such as scanning control. For example, the touch panel driver may scan each sensor in an electrostatic capacitance transparent electrode pattern in the x-direction and the y-direction, and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object is within a predetermined distance from the operating surface of the touch panel display screen. That is, an electrostatic capacitance above a given background level may be detected when an instruction object is near, but not necessarily touching, the operating surface of the touch panel 130. Accordingly, the controller 110 may determine that a touch operation has occurred in response to detecting an electrostatic capacitance above a predetermined threshold, wherein the threshold magnitude corresponds to a condition when the instruction object is within a predetermined distance from the operating surface of the touch panel. In certain embodiments, the touch panel driver may control a detection sensitivity of the touch panel 130. For example, there may exist scenarios in which a higher or lower sensitivity is desirable, in which case the touch panel driver, under control of the controller 110, may adjust the sensitivity. Exemplary processing related to controlling a sensitivity of the touch panel 130 will be described in detail in later paragraphs.

The operation key 140 may include one or more buttons similar to external control elements (e.g., power control, volume control, standby control, etc.). The operation key 140 may generate an operation signal based on a detected input. The operation signals generated by the operation key 140 may be supplied to the controller 110 for performing related processing control of the terminal device 100. In certain aspects of the present disclosure, the processing and/or functions associated with external buttons and the like may be performed by the controller 110 in response to an input operation on the touch panel 130 in lieu of implementing the terminal device with external buttons in the operation key 140.

The memory 150 may include, e.g., Read Only Memory (ROM), Random Access Memory (RAM), or a memory array comprised of a combination of volatile and nonvolatile memory units. The memory 150 may be utilized as working memory by the controller 110 while executing the processing and algorithms of the present disclosure. Additionally, the memory 150 may be used for long-term storage, e.g., of images and information related thereto.

The terminal device 100 includes a control line CL and a data line DL as internal communication bus lines. Control data to/from the controller 110 may be transmitted through the control line CL. The data line DL may be used for transmission of voice data, display data, etc.

Figure 6:
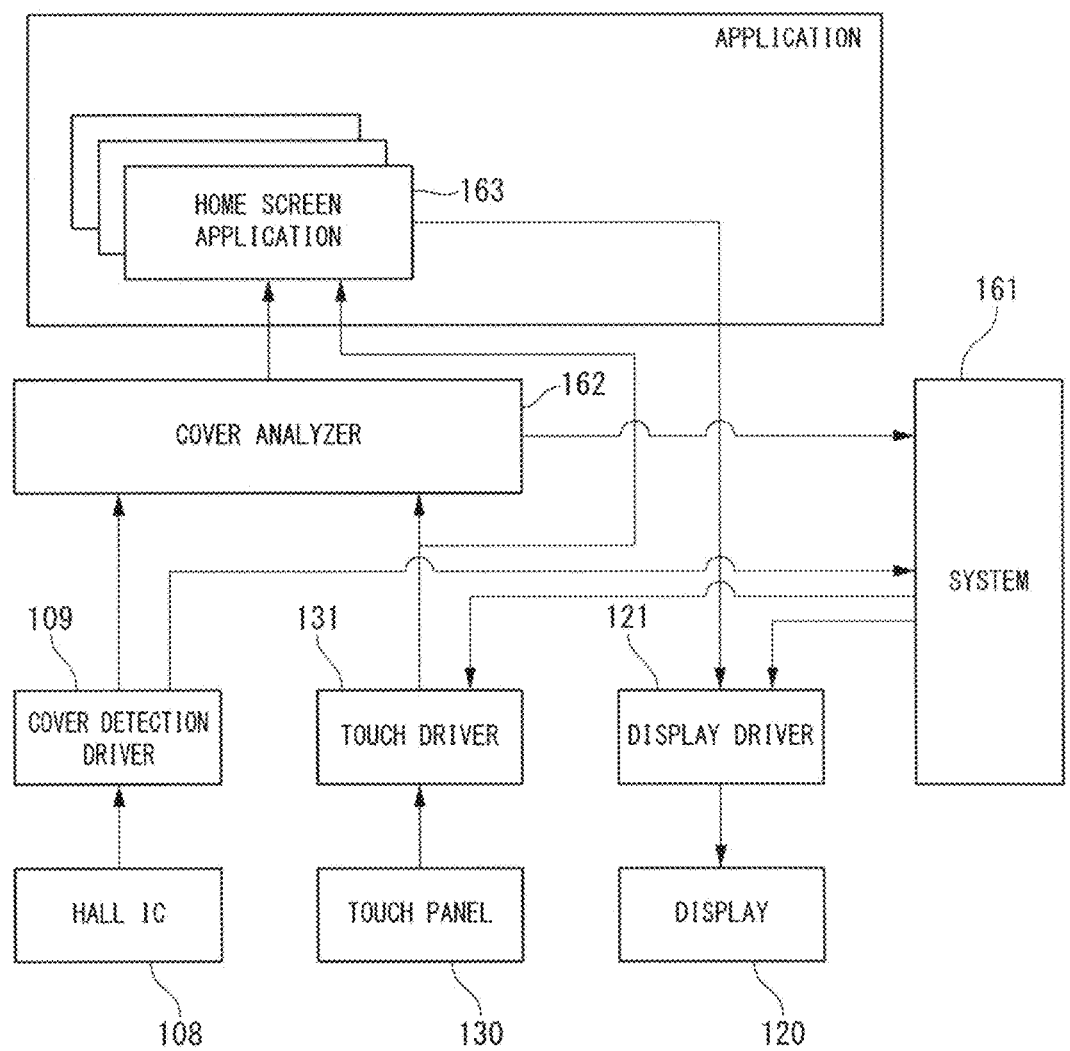
FIG. 6 illustrates a non-limiting exemplary flow diagram corresponding to instructions executed by processing circuitry included in a terminal device, according to certain embodiments.

Next, FIG. 6 illustrates a non-limiting exemplary flow diagram corresponding to software instructions executed by processing circuitry included in a terminal device, according to certain embodiments. For simplicity, FIG. 6 will be described assuming an implementation corresponding to the exemplary terminal device 100.

The exemplary diagram illustrated in FIG. 6 includes an cover detection driver 109, a touch driver 131, a display driver 121, a system 161, a cover analyzer 162, and a home screen application 163. In certain embodiments according to the present disclosure, it may be assumed that these elements are implemented by, or under the control of, processing circuitry included in the terminal device 100. For example, the elements illustrated in FIG. 6 may be implemented by, or under the control of, the controller 110.

Referring to FIG. 6, the cover detection driver 109 receives a signal from the Hall IC 108 corresponding to a detection signal indicating an opening/closing of the cover 1. For example, the Hall IC 108 may generate a signal in response to detecting the magnet M1 or the magnet M2 within a predetermined distance relative to the terminal device 100. Based on the signal received from the Hall IC 108, the cover detection driver 109 performs processing for determining whether the cover (e.g. the first member 2 and/or the second member 3) is in an open position or a closed position. Following the processing for determining the open/closed status of the cover 1, the cover detection driver 109 outputs a determination result to the system 161 and the cover analyzer 162. For the purposes of the present disclosure, it may be assumed that the system 161 performs processing for control of the terminal device 100 as a whole.

Based on a signal output from the one or more touch sensors included in the touch panel 130, the touch driver 131 may detect a coordinate or coordinates corresponding to a detected touch operation, and transmit the detected coordinates to the cover recognizing/judging module 162. Moreover, the touch driver 131 may output the coordinates corresponding to the detected touch operation to the home screen application 163. In addition to generating an output corresponding to a touch operation performed, for example, by a stylus-type instruction object or a finger, the touch driver 131 may receive a signal output by the one or more touch sensors included in the touch panel 130 corresponding to detected coordinates of one or more projections included in the cover 1. For example, the one or more projections included in the cover 1 may be detected by the touch sensors and as a result of the detection, the one or more touch sensors may output coordinates of the projections included on the cover 1 (e.g. the projections 7 through 20 illustrated in FIG. 1). Accordingly, the touch driver 131 may output the coordinate positions of the detected projections to the cover analyzer 162, and the cover recognizing/judging module 162 may determine an arrangement position of the one or more projections included on the cover 1.

The cover analyzer 162 recognizes that the cover 1 is in the closed position based on the signal supplied from the cover detection driver 109 and the touch driver 131. Based on the received signals from the cover detection driver 109 and the touch driver 131, the cover analyzer 162 may perform processing related to the determination of various information related to the cover 1. In certain implementations, the process for determining the information related to the cover 1 may be based on a determination of an arrangement position of projections included on the cover 1. As non-limiting examples of information related to the cover 1 that may be determined based on an arrangement position of projections included on the cover 1, the cover analyzer 162 may determine a color of the cover, a pattern of the cover, a shape of the cover, a position of a cover window, a size of a cover window, a size of the cover, a raw material of the cover, a thickness over the cover, etc., corresponding to the cover 1. The cover analyzer 162 may output the information related to the cover 1 to an application such as the home screen application 163.

Based on the information related to the cover 1 received from the cover analyzer 162, the home screen application 163 may control an interface output on the display 120. For example, based on the information related to the cover 1, the home screen application 163 may control a display 120 such that the interface displayed on the display 120 changes size, display position, content, etc. For example, the home screen application 163 may change the background of an interface displayed on the display 120 based on a pattern indicated by the information related to the cover 1 received from the cover analyzer 162. As another example, the home screen application 163 may change a color of an interface displayed on the display 120 based on the received color information related to the cover 1. As another example, the home screen application 163 may control the content displayed in an interface on the display 120 based on a determination of the window size of the cover 1. Further, the home screen application 163 may generate image data corresponding to an interface for a camera application when the information related to the cover 1 indicates that the window of the cover 1 is relatively large such as the case with window 6, or the home screen application 163 may control the interface such that the interface includes image data corresponding to a standby screen when the information related to the cover 1 indicates that the window included in the cover 1 is relatively small such as the case for the window 5.

As discussed previously, in addition to controlling aspects of the display 120 based on a determined arrangement position of projections included on the cover 1, in certain embodiments the cover analyzer 162 may control a touch detection sensitivity of the touch panel 130 based on a determined arrangement position of the projections on the cover 1. For example, the cover analyzer 162 may perform processing for increasing the touch detection sensitivity of the touch panel 130 to compensate for an expected separation between the one or more touch sensors and an instruction object performing touch operations (e.g. a finger or stylist). An expected separation between the instruction object and the one or more touch sensors (i.e. a separation expected beyond the normal expected separation when performing touch operations directly on the operating surface of the touch panel 130) may occur, for example, when the cover 1 is in the closed position. However, despite the cover being closed, it still may be desirable to perform touch operations on the surface of the cover 1 (e.g. as in the illustration shown in FIG. 2). Accordingly, the cover analyzer 162 may adjust the touch detection sensitivity of the touch panel 130 based on the information related to the cover 1 such as the thickness, the raw material, etc., which would have an influence on the detection of touch operations performed when the cover 1 is in the closed position. For example, the cover analyzer 162 may increase the touch detection sensitivity of the one or more touch sensors included in the touch panel 130 proportionally to an increasing thickness of the cover 1. As another example, the cover analyzer 162 may increase the touch sensitivity of the one or more touch sensors included in the touch panel 130 inversely proportional to a decrease in permeability of the material of which the cover 1 is composed.

Referring still to FIG. 6, the display driver 121 performs control processing for updating content displayed in an interface on the display 120 based on image data transmitted by the home screen application 163. For example, in response to receiving information relating to the cover 1, the home screen application 163 may output a signal for controlling content within the interface displayed on the display 120, and the display driver 121 may control the display 120 such that the interface is updated with the new content.

The system 161 performs a suspension process based on data received from the cover analyzer 162. Additionally, the system 161 performs a resume process based on a command signal received from the cover detection driver 109. The system 161 sends a suspension command and a resume command to the touch driver 131 and the display driver 121 to place these elements in the suspended or active state, respectively.

Figure 7:
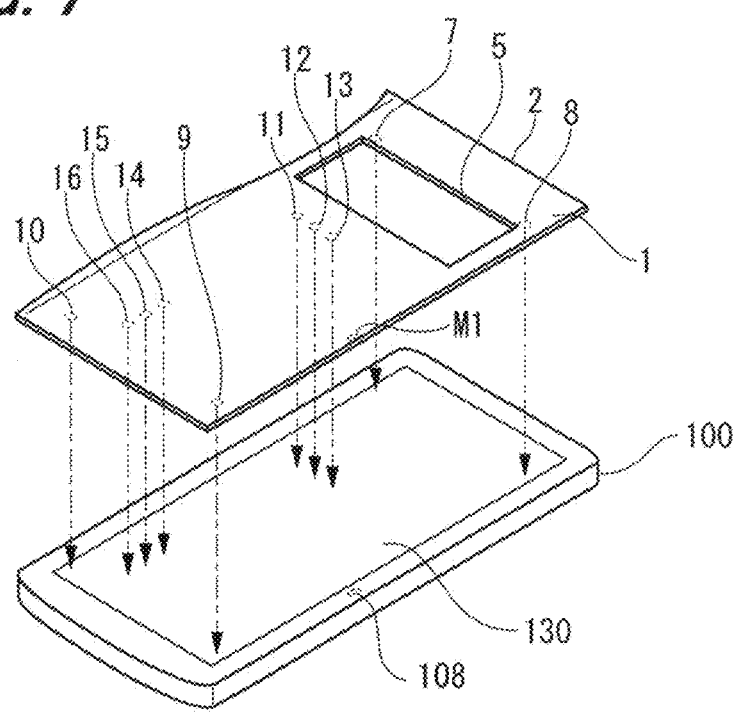
FIG. 7 illustrates a non-limiting exemplary perspective view of a cover attached to a terminal device, according to certain embodiments.

Next, FIG. 7 illustrates a non-limiting exemplary perspective view of a cover attached to a terminal device, according to certain embodiments. In particular, the illustration in FIG. 1 shows the first member 2 of the cover 1 attached to a surface of the terminal device 100. In this example, the one or more touch sensors included in the touch panel 130 may detect coordinate positions corresponding to the projections 7 through 16. Based on the coordinate positions of the various projections included on the first member 2, processing circuitry included in the terminal device 100 may determine an arrangement position of the various projections. Based on the determined arrangement position of the projections, the processing circuitry may determine information related to the cover 1. In certain embodiments, one or more of the projections on the first member 2 may correspond to projections used to determine a position confirmation of the cover 1 with respect to the terminal device 100, and other projections included on the first member 2 may be used for determining information related to the cover 1. For example, projections 7 through 10 on the first member 2 may be detected by the one or more touch sensors included in the touch panel 130, and an arrangement position of the projections 7 through 10 may be determined by the processing circuitry of the terminal device 100. Based on the arrangement position corresponding to the projections 7 through 10, the processing circuitry may determine a position of the first member 2 with respect to the touch panel 130. Additionally, the processing circuitry may determine a misalignment of the first member 2 with respect to the touch panel 130, and the determined misalignment between the two elements may be then applied for additional processing related to the correction of the misalignment, which will be discussed in later paragraphs.

As a non-limiting example of projections that may correspond to projections for providing information related to the cover 1, the projections 11 through 16 of the first member 2 may be detected by the one or more touch sensors included in the touch panel 130, and an arrangement position of the projections 11 through 16 may be determined based on the detected coordinate positions of these projections. Based on the determined arrangement position corresponding to the projections 11 through 16, the processing circuitry of the terminal device 100 may determine various information related to the cover 1. For example, based on the arrangement position of the projections 11 through 16, the processing circuitry may determine the color, shape, size, etc., of the cover 1. Moreover, each of the individual projections, of the projections 11 through 16, may correspond to a different feature related to the cover 1. For example, the projection 11 may correspond to a color of the cover 1, the projection 12 may correspond to the size of the cover 1, etc. Accordingly, based on a relative position of each of the individual projections with respect to an information confirming area on the touch panel 130, the processing circuitry of the terminal device 100 may determine individual features related to the cover 1.

Figure 8:
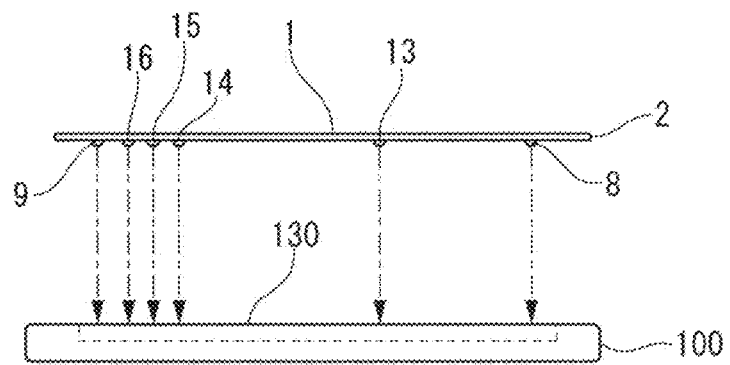
FIG. 8 illustrates a side view of the terminal device and cover of FIG. 7.

Next, FIG. 8 illustrates a side view of the terminal device and cover illustrated in FIG. 7. The exemplary view illustrated in FIG. 8 shows the various positions of projections 8, 9, and 14-16 relative to the touch panel 130. When the first member 2 of the cover 1 is in the closed position such that the projections shown in FIG. 8 are substantially in contact with an operating surface of the touch panel 130, the one or more touch sensors of the touch panel 130 may determine coordinates corresponding to the projections, and the processing for determining information relating to the cover 1 may be performed based on the determined coordinate positions. As discussed previously, in certain implementations, the projections of the first member 2 may be implemented such that the projections do not physically project from the surface of the first member 2. For example, the projections may be composed of an electrically conductive material embedded within the first member 2. Accordingly, the one or more touch sensors of the touch panel 130 may detect a presence of the projections embedded in the first member 2 without the projections necessarily directly contacting the operating surface of the touch panel 130. For example, in implementations in which an electrostatic capacitance-type touch panel is used, the one or more touch sensors may detect an electrostatic capacitance corresponding to the projections embedded within the first member 2, and a coordinate position of each of the projections embedded in the first member 2 may be determined based on the detected electrostatic capacitance, even though the projections do not physically touch the operating surface of the touch panel. Therefore, the term "projection" hereinafter is not limited to an interpretation in which the elements for determining information related to the cover are physically projecting from the surface of the cover, but rather other arrangements may be applied.

Figure 9:
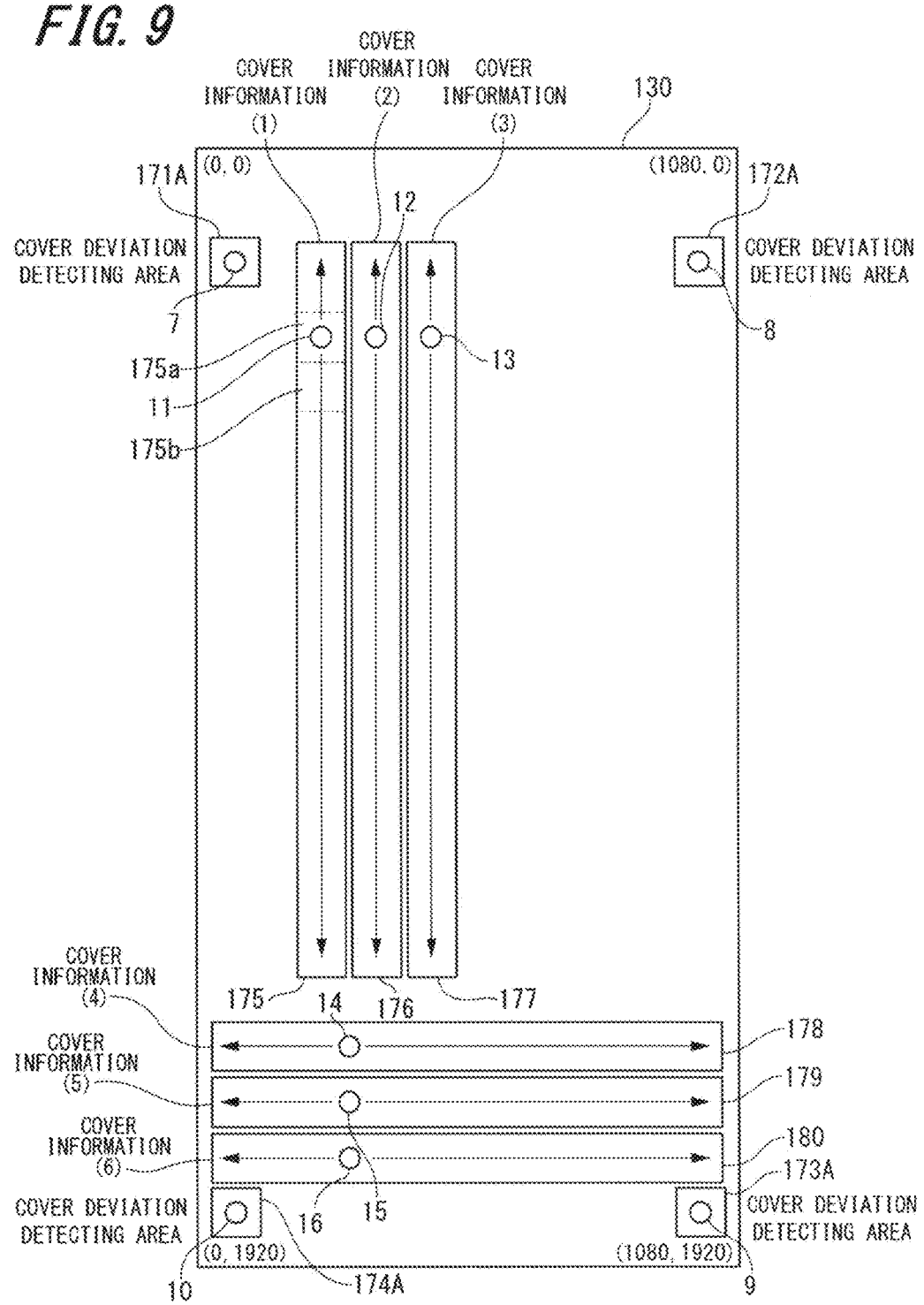
FIG. 9 illustrates exemplary information confirmation areas corresponding to a touch panel included in a terminal device, according to certain embodiments.

Next, FIG. 9 illustrates exemplary information confirmation areas corresponding to a touch panel included in a terminal device, according to certain embodiments. Specifically, the exemplary embodiment illustrated in FIG. 9 includes six information confirming areas included in the touch panel 130.

Referring to FIG. 9, the touch panel 130 has horizontal coordinates from 0 to 1080, and vertical coordinates from 0 to 1920. Accordingly, when the one or more touch sensors included in the touch panel 130 detect a touch operation performed on an operating surface of the touch panel 130, a signal indicating the coordinate corresponding to the touch operation may be output, and the coordinate information may include coordinates within the range illustrated in the embodiment of FIG. 9.

The touch panel 130 of FIG. 9 includes information confirming areas 175 through 180. Each of the information confirming areas illustrated in FIG. 9 may include an associated coordinate range corresponding to each information confirming area. In other words, the one or more touch sensors of the touch panel 130 may detect a touch operation performed within one of the information confirming areas, and the relative coordinate of the touch operation with respect to the information confirming area may be analyzed by the processing circuitry included in the terminal device 100 such that information corresponding to the cover 1 may be determined. The information confirming areas 175 through 180 in this example correspond to respective categories of information related the cover 1. For example, the information confirming area 175 in FIG. 9 may be set to correspond to a color of the cover 1. Accordingly, when a touch operation is detected within a coordinate range corresponding to the information confirming area 175, the processing circuitry of the terminal device 100 may determine information relating to the color of the cover 1. Specifically, the one or more touch sensors of the touch panel 130 may output a position corresponding to a touch operation with respect to the projection 11 within the information confirming area 175, and the controller 110 may determine, based on the coordinate position of the projection 11 relative to the coordinate range of the information confirming area 175, a color corresponding to the cover 1. For example, if the controller 110 determines that the coordinates of the touch operation performed by the projection 11 are detected within the area 175a, the controller 110 may determine that the cover 1 is white in color. Similarly, if the controller 110 determines that the coordinates of the projection 11 correspond to the area 175b, the controller 110 may determine that the cover 1 is red in color, and so on. In certain embodiments, the determination as to the information corresponding to the cover 1 (e.g. the color, etc.) may be determined by the cover analyzer 162.

Other exemplary categories of information relating to the cover 1 that may be determined based on detected coordinate positions within the various information confirming areas included in the touch panel 130 include a pattern, a shape, a position of a window, a size of a window, and a raw material corresponding to the cover 1. In non-limiting exemplary implementations, the cover analyzer 162 may determine a pattern of the cover 1 based on a relative touch position of the projection 12 within the information confirming area 176; the cover analyzer 162 may determine a shape of the cover 1 based on a relative touch position of the projection 13 within the information confirming area 177; the cover analyzer 162 may determine a position of a window included in the cover 1 based on a relative touch position of the projection 14 within the information confirming area 178; the cover analyzer 162 may determine a size of a window corresponding to the cover 1 based on a relative touch position of the projection 15 within the information confirming area 179; and the cover analyzer 162 may determine a raw material of the cover 1 based on a relative touch position of the projection 16 within the information confirming area 180. The various information relating to the cover 1 determined by the processing circuitry based on the touch position of the projections with respect to the information confirming areas may be output as cover information (1) through (6).

In addition to the various information confirming areas included in the exemplary touch panel 130 shown in FIG. 9, the touch panel 130 may also include one or more cover deviation detecting areas. In certain embodiments, the cover deviation detecting areas may be implemented for determining a deviation/misalignment of the cover 1 with respect to the touch panel 130. For example, four deviation detecting areas 171A through 174A are set to the touch panel 130. In the example of FIG. 9, the cover deviation detecting areas 171A through 174A are provided in positions corresponding to the four corners of the touch panel 130, or in the vicinity thereof. However, this arrangement is not limiting, and other arrangements of the cover deviation detecting areas may be implemented. Further, in certain embodiments, greater than or less than four cover deviation detecting areas may be included in the touch panel 130.

In certain embodiments, when the one or more touch sensors of the touch panel 130 detect a touch operation and corresponding coordinates of the projections 7 through 10 with respect to the cover deviation detecting areas 171A through 174A, the processing circuitry of the terminal device 100 may determine, based on the relative coordinates of the projections with respect to the cover deviation detecting areas, a misalignment between the cover 1 and the touch panel 130. For example, the processing circuitry may determine, based on the coordinates of the projections with respect to a reference position corresponding to each of the cover deviation detecting areas, a direction and magnitude of an offset of the projection coordinate positions relative to the reference position(s). Based on the detected deviation of the coordinate positions of the projections with respect to the cover deviation detecting areas, the processing circuitry of the terminal device 100 may determine a deviation/misalignment of the cover 1 with respect to the touch panel 130, and the processing circuitry may perform a process for correcting the deviation between the cover 1 and the touch panel 130, which will be discussed in greater detail in later paragraphs.

It is noted that although the example of FIG. 9 illustrates the various cover deviation detecting areas 7 through 10 as being square in shape, the illustrated shape of the cover deviation detecting areas is not limiting, and other shapes may be implemented. For example, the cover deviation detecting areas may be round in shape. Moreover, as mentioned previously, the cover deviation detecting area positions illustrated in FIG. 9 are not limiting, and other arrangements of the cover deviation detecting areas may be chosen, provided that the position of the cover deviation detecting areas does not interfere with a window position of a cover. In addition, the various areas shown within the information confirming areas illustrated in FIG. 9 indicate that various information corresponding to the cover 1 may be set within a range corresponding to these areas. For example, the processing circuitry of the terminal device 100 may divide the respective ranges of the information confirming areas illustrated in FIG. 9 into two or more segments that may correspond to information relating to each of the respective categories assigned to the information confirming area, and a relative position of the projections with respect to these areas may then be used by the processing circuitry to determine the information corresponding to the respective categories.

Figure 10:
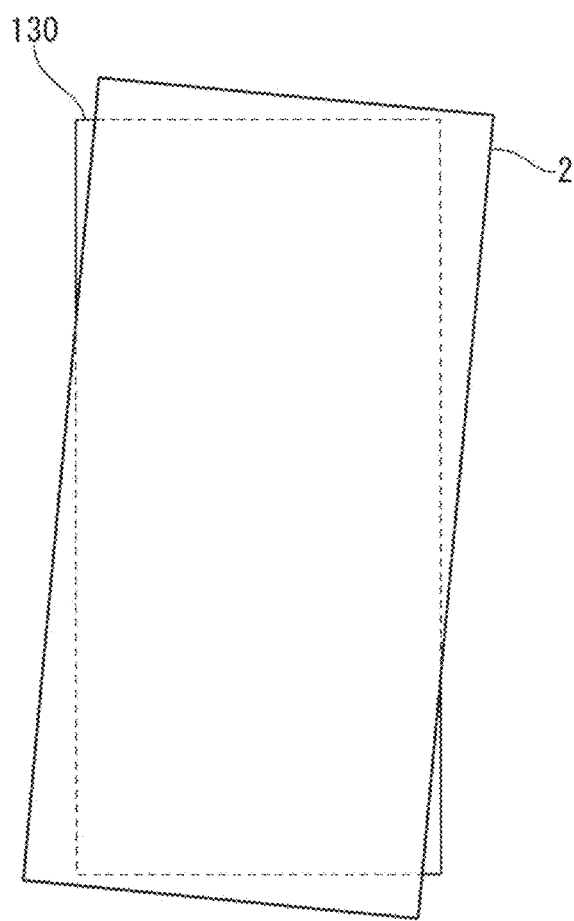
FIG. 10 illustrates an example of a misalignment between a terminal device touch panel and a cover, according to certain embodiments.

Next, FIG. 10 illustrates an example of a misalignment between a terminal device touch panel and a corresponding cover, according to certain embodiments. Specifically, the example of FIG. 10 illustrates an example in which the position of the cover 1 (i.e., first member 2) with respect to the touch panel 130 has been misaligned when the cover 1 is attached to the terminal device 100 and the cover 1 is in the closed position. As discussed previously, since the coordinate positions of the various projections included on an inner surface of the first member 2 may be detected by the one or more sensors of the touch panel 130, and the resultant detection of these coordinates may be output for determination processing related to determining information corresponding to the cover 1, the misalignment between the first member 2 and the touch panel 130 may be determined and corrected based on the detected coordinate positions of the various projections with respect to the touch panel 130. Specifically, in certain embodiments, the processing circuitry of the terminal device 100 may implement a technique which corrects the misalignment between the cover 1 and the touch panel 130 by measuring a deviation of the coordinate positions of the projections relative to a reference point. Exemplary processing corresponding to a method for determining and correct a misalignment between the cover 1 and the touch panel 130 will now be discussed in detail with respect to FIG. 11.

Figure 11:
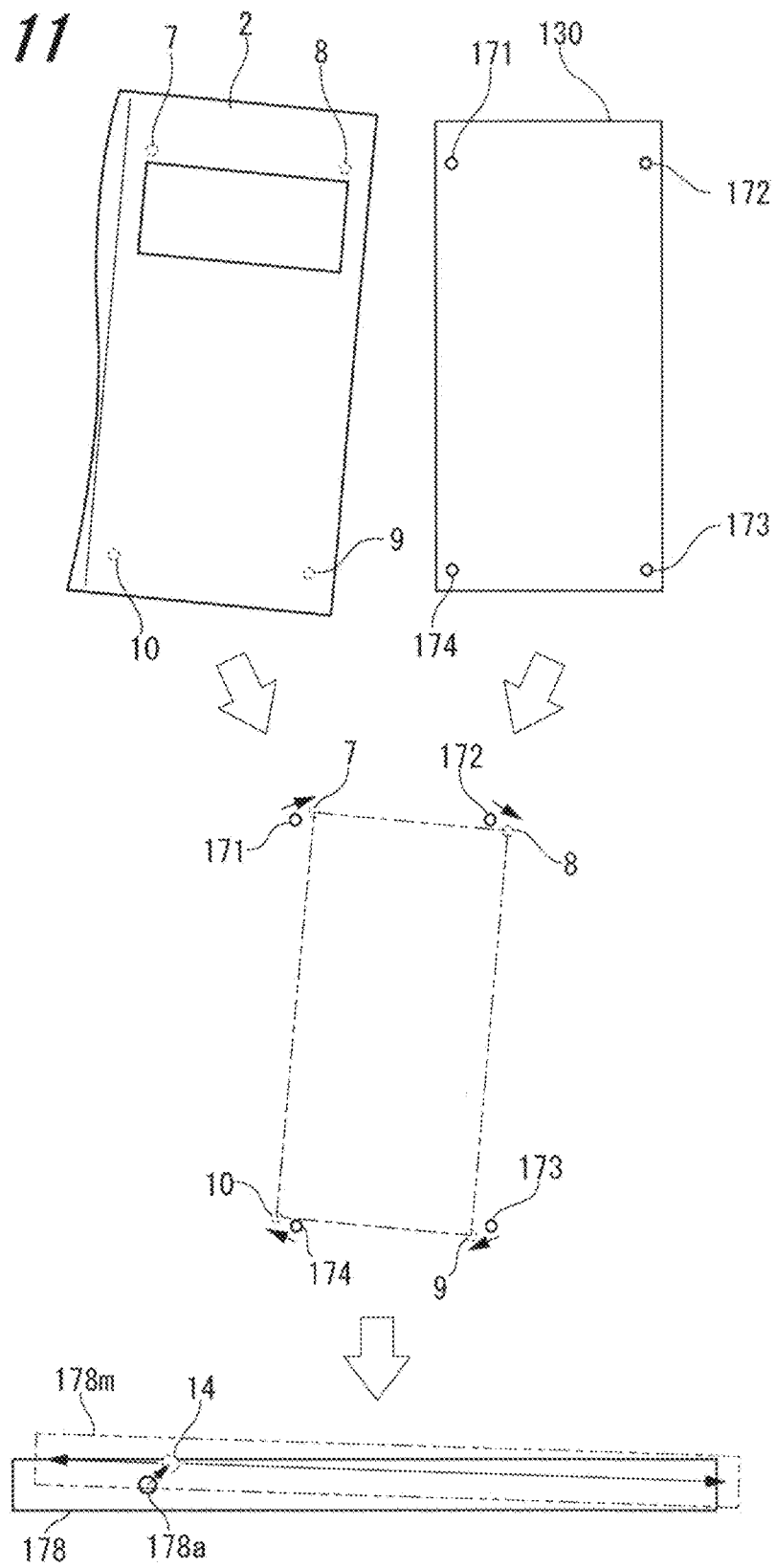
FIG. 11 illustrates an exemplary process of correcting a misalignment between a terminal device and a cover, according to certain embodiments.

FIG. 11 illustrates an exemplary process for correcting a misalignment between a terminal device and a cover, according to certain embodiments. In particular, the exemplary processing illustrated in FIG. 11 corresponds to a process for correcting a misalignment between the cover 1 (first member 2) and the touch panel 130, such as the misalignment shown in FIG. 10.

Referring to the top portion of FIG. 11, reference points 171 through 174 of the touch panel 130 in FIG. 11 may be set, for example, to a position corresponding to a center (or center of gravity) of the cover deviation detecting areas 171A through 174A, respectively. When the cover 1 (first member 2) and the touch panel 130 have been misaligned, as shown in the middle portion of FIG. 11, the processing circuitry of the terminal device 100 may measure the misalignment amount and the direction of the misalignment of the projections 7 through 10 with respect to the reference points 171 through 174. From the exemplary illustration shown in the middle portion of FIG. 11, the measurement of the distance of the misalignment may correspond to the length of the four arrows illustrated in the figure, and the direction of the misalignment may correspond to the direction of the arrows illustrated in the figure.

In certain embodiments, the processing circuitry of the terminal device 100 may correct a position of an information confirming area included on the touch panel 130 based on the misalignment amount and direction, as shown in the lower portion of FIG. 11. Specifically, referring to the lower portion of FIG. 11, the processing circuitry may shift the initial position of the information confirming area 178 to a new position corresponding to information confirming area 178m. Accordingly, the coordinate 178a in the information confirming area 178 corresponds to the position of the projection 14 illustrated within the information confirming area 178m.

Figure 12:
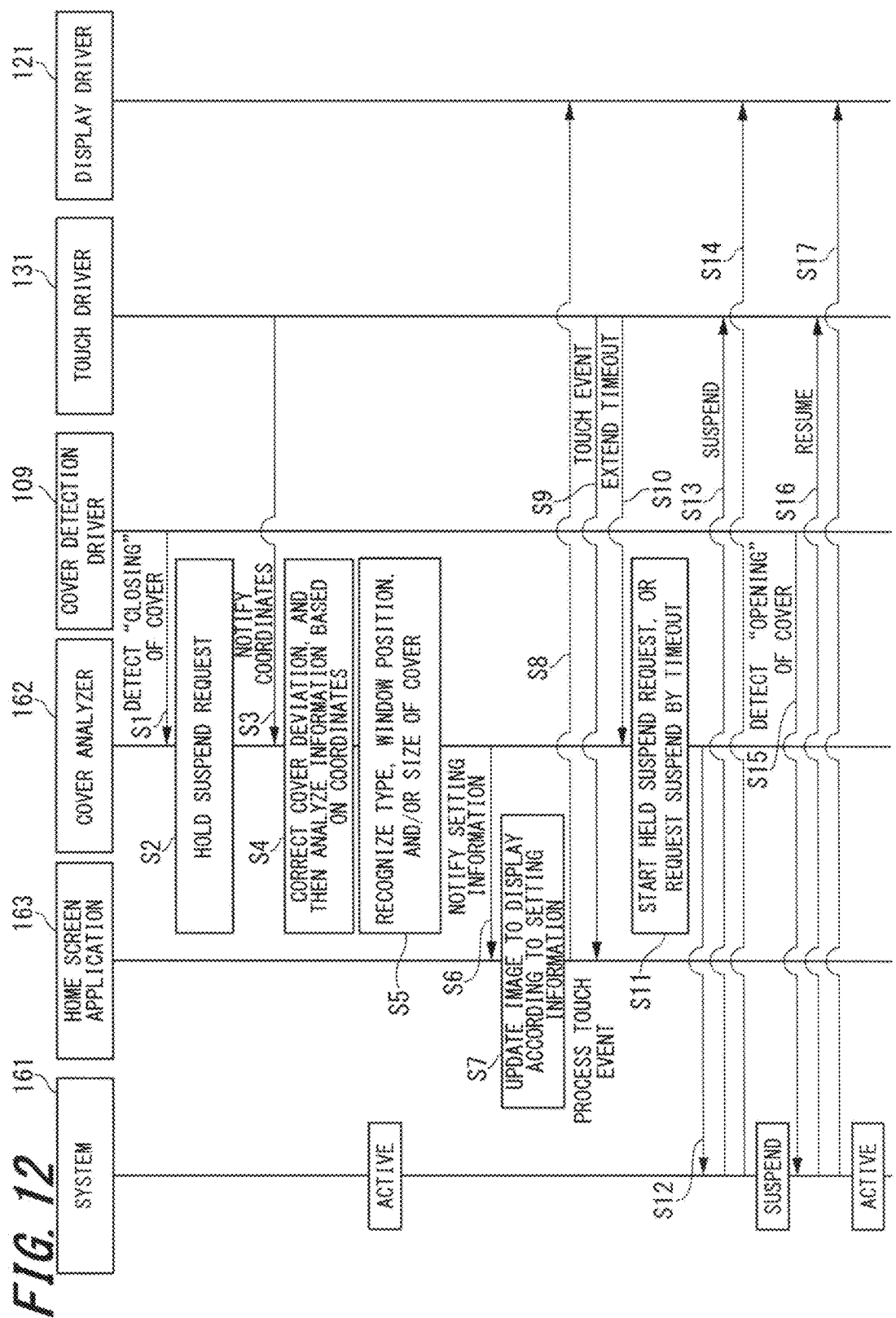
FIG. 12 illustrates an exemplary sequential flow chart demonstrating a method of controlling a display based on information related to a terminal device cover, according to certain embodiments.

Next, FIG. 12 illustrates an exemplary sequential flowchart demonstrating a method of controlling a display based on information related to a terminal device cover, according to certain embodiments. Specifically, the exemplary process illustrated in FIG. 12 demonstrates a method for controlling a content of an interface output on the display 120, as well as a position of the interface output on the display 120 based on information related to the cover 1. However, it is noted that the processing of FIG. 12 could be adapted to control other aspects of a display interface, such as a display position, display size, etc.

At step S1, the cover detection driver 109 outputs a detection signal indicating a "closing" of the cover 1. In certain embodiments, the detection signal indicating the closing of the cover 1 is output to the cover analyzer 162. Further, in certain embodiments, the detection signal may be output as a result of a signal received from the Hall IC 108 indicating that the cover 1 (i.e., first member 2 or second member 3) is in the closed position.

At step S2, the cover analyzer 162 performs a process for holding a suspense request with respect to the system 161. For example, in a common terminal device, when a cover such as the cover 1 is detected to be in the closed position, processing circuitry included in the device may perform a suspension process. For example, in a typical suspension process, the working state of each element within the device may be saved in memory, and the device may be transferred to a power saving mode which turns off the display and touch screen included in the device. However, operation of a graphical user interface in the suspended state becomes impossible. Therefore, in this disclosure, the processing circuitry may control elements of the device such that even if the cover 1 is detected to be in the closed position, a suspended state is not requested, but rather the device remains in a state in which the user may perform operations with respect to an interface output on the display 120.

At step S3, the touch driver 131 determines the coordinate positions at which the projections 7 through 10 contact the operating surface of the touch panel 130, and the touch driver 131 outputs the determined coordinates to the cover analyzer 162.

At step S4, the cover analyzer 162 determines whether the cover 1 and the touch panel 130 have a misalignment based on the coordinates of the touch positions corresponding to the projections 7 through 10. When there exists a misalignment, the cover analyzer 162 determines the misalignment direction and amount, and corrects the position of the information confirming areas 175 through 180 based on the misalignment amount and direction. Following the correction of the misalignment, the cover analyzer 162 determines information relating to the cover 1 based on the coordinate positions corresponding to contact positions of the projections 11 through 16 with respect to the touch panel 130. For example, the cover analyzer 162 analyzes the coordinate positions of the projections 11 through 16 with respect to the information confirming areas such that various information relating to the cover 1 may be determined.

At step S5, the cover analyzer 162 determines features related to the cover 1 (e.g. a color, a pattern, a shape, etc.), and a position and a size of a window included in the cover 1, based on the coordinate positions with respect to the information confirming areas analyzed in step S4.

At step S6, the cover analyzer 162 determines setting information based on the information relating to the cover 1 determined at step S5. In certain embodiments, the setting information determined at step S6 may correspond to information for controlling an interface output on the display 120 based on the information relating to the cover 1. For example, the setting information may correspond to control instructions for controlling a content, position, color, pattern, etc., of an interface displayed on the display 120. Following the determination of the setting information, the cover analyzer 162 outputs the setting information to the home screen application 163.

At step S7, the home screen application controls the display 120 such that the interface output on the display 120 is updated in accordance with the received setting information. For example, the home screen application 163 at step S8 may generate image data corresponding to a content of the user interface after an update, and the home screen application 163 may output the image data to the display driver 121. The display driver 121 may then perform a process for generating/outputting the sent image data to the display 120.

At step S9, the touch driver 131 notifies the home screen application 163 that a touch event has occurred based on a detection of an instruction object contacting an operating surface of the touch panel 130. The home screen application 163 then generates image data according to the content of the touch event, and sends the image data to the display driver 121. For example, in response to receiving coordinate information corresponding to a touch event, the home screen application 163 may generate image data corresponding to the coordinate data, and the image data may be output to the display driver 121 such that it may be output on the display 120.

At step S10, the touch driver 131 requests an extension of a timeout from the cover analyzer 162 when a predetermined time period elapses during which a touch event is not detected. As a result of extending the timeout period, the process of the timeout is not performed, but instead the touch driver 131 (touch panel 130) and the display driver 121 (display 120) continue operation.

At step S11, the cover analyzer 162 starts a suspension process by requesting the suspended state with respect to the system 161, or makes a suspension request in response to a timeout occurrence. For example, the system 161 may restart a suspension based on a suspension request received from the cover analyzer 162, whereby the suspension request is generated as a result of the time extension requested by the touch driver 131 at step S10 being elapsed (or another predetermined time period elapsing).

At step S12, the cover analyzer 162 outputs the suspension request to the system 161. The system 161 is in the active state until it receives the suspension request.

At step S13, the system 161 receives the suspension request and performs a suspension process with respect to the touch driver 131.

At step S14, the system 161 performs a suspension process with respect to the display driver 121. Following the performance of the suspension process for the touch driver 131 and the display driver 121, the system 161 will be in a suspended state.

At step S15, when the cover 1 is placed in the open position, the cover detection driver 109 notifies the cover analyzer 162 that the cover 1 was placed in the open position. In certain embodiments, the determination that the cover 1 has been placed in the open position may be determined based on an input received from the Hall IC 108.

At step S16, the system 161 receives the signal indicating that the cover 1 in the open position, and the system 161 cancels the suspended state and performs a resume process with respect to the touch driver 131. For example, in the resume process, the working state of each element of the terminal device 100 just before being in the suspended state may be read from the memory 150, and each element restarts work based on the determined/stored working state.

At step S17, the system 161 performs a resume process with respect to the display driver 121. The resume process performed with respect to the display driver 121 may be similar to the aforementioned process performed with respect to the touch driver 131. Following the performance of the resume process for the touch driver 131 and the display driver 121, the system 161 is in the active state.

Figure 13:
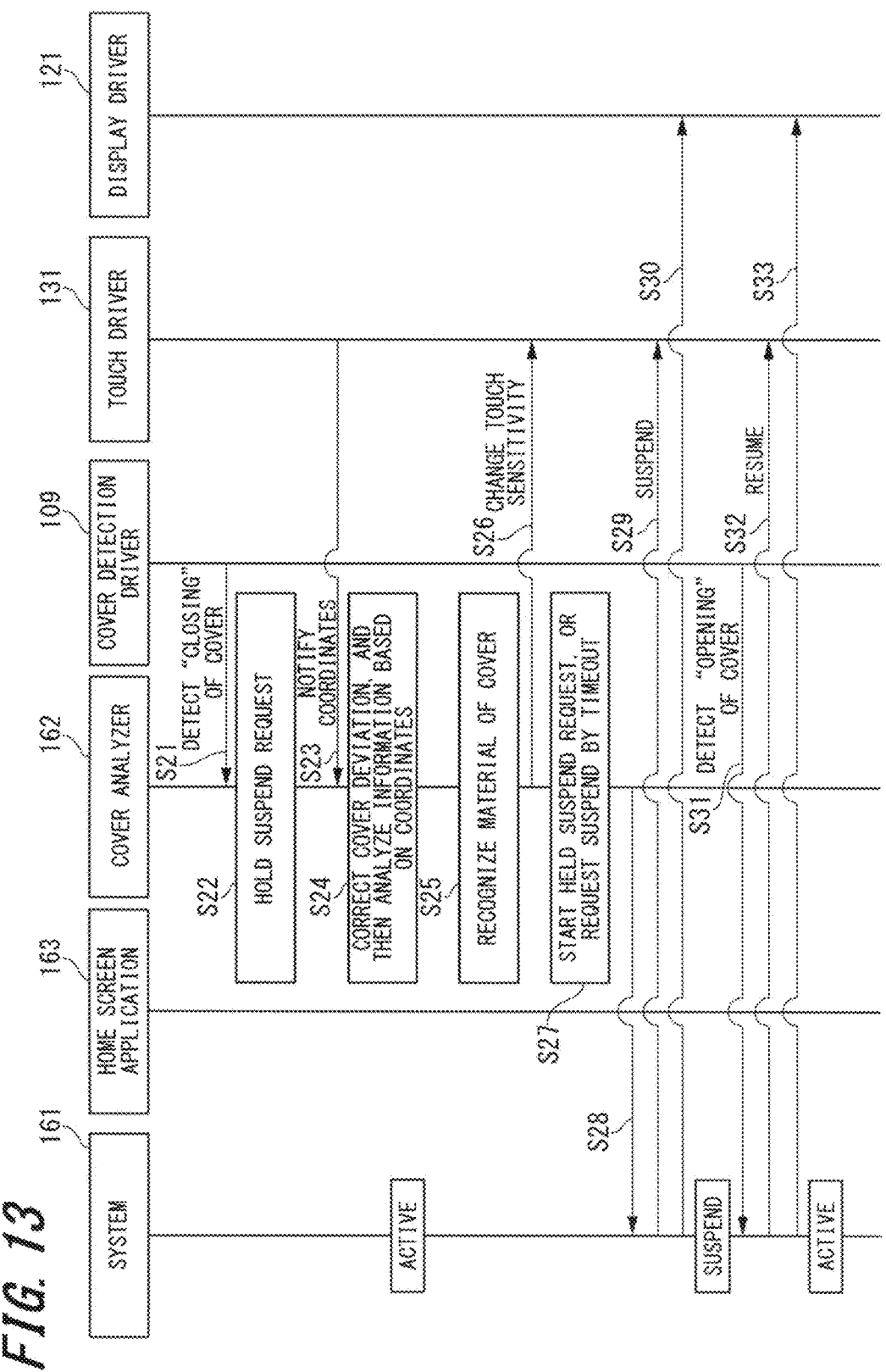
FIG. 13 illustrates an exemplary sequential flow chart demonstrating a method of controlling a touch screen panel's touch sensitivity based on information related to a terminal device cover, according to certain embodiments.

Next, FIG. 13 illustrates an exemplary sequential flowchart demonstrating a method of controlling a touch screen panel's touch sensitivity based on information related to a terminal device cover, according to certain embodiments. Specifically, the exemplary processing illustrated in FIG. 13 demonstrates processing for controlling a touch sensitivity of the touch panel 130 based on a determined material of the cover 1. However, it should be appreciated that the methods illustrated in FIG. 13 and described herein may be implemented such that a touch sensitivity of a touch panel display is controlled based on any information related to the cover determined by methods described in the present disclosure.

Referring to FIG. 13, steps S21 through S24 in FIG. 13 are similar to steps S1 through S4 illustrated and discussed above with respect to FIG. 12. Accordingly, these steps will not be described here for the sake of brevity.

At step S25, the cover analyzer 162 determines the raw material of the cover 1 as information related to the cover 1 (or related to first member 2, second member 3, etc.). As discussed throughout the present disclosure, the determination of information relating to the cover 1, such as the raw material of the cover 1, may be determined in certain embodiments based on an arrangement position of projections on the cover 1.

At step S26, the cover analyzer 162 performs a process for changing the touch sensitivity of the touch panel 130 via the touch driver 131. The process of changing the touch sensitivity of the touch panel 130 at step S26 is based on the recognized information relating to the cover 1 determined at step S25. For example, the cover analyzer 162 may change the touch sensitivity of the touch panel 130 such that the touch sensitivity is higher when it is determined in step S25 that the cover 1 is composed of a material typically having a lower permeability for detecting touch operations when the cover 1 is in the closed position. Accordingly, the user may still perform touch operations when the cover 1 is in the closed position by contacting the surface of the cover 1 directly rather than contacting the operating surface of the touch panel 130.

Next, steps S27 through S33 of FIG. 13 are similar to steps S11 through S17 of FIG. 12 and therefore, a repeated description of steps S27 through S33 will not be provided here.

Figure 14:
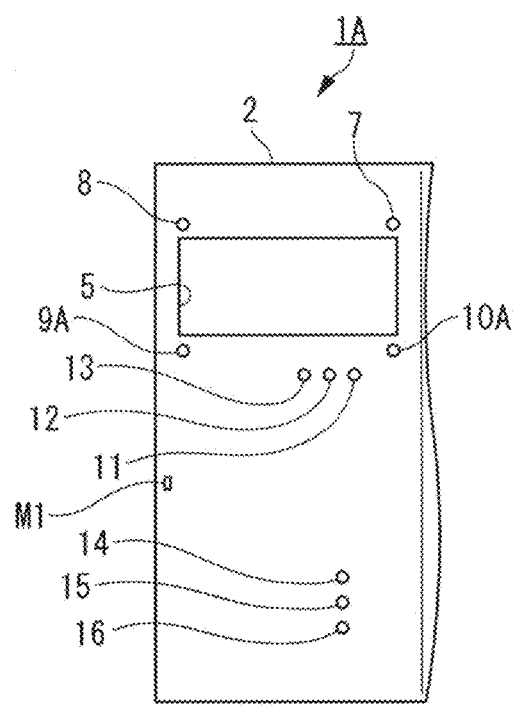
FIG. 14 illustrates an exemplary terminal device cover with projections for indicating a size of a window in the cover, according to certain embodiments.

Next, FIG. 14 is an exemplary drawing illustrating a modification of the exemplary cover 1 shown in FIG. 1. Specifically, FIG. 14 illustrates an exemplary terminal device cover with projections for indicating a size of a window in the cover, according to certain embodiments.

Referring to FIG. 14, the modified exemplary cover 1A illustrated in FIG. 14 includes projections 7, 8, 9A, and 10A. In certain implementations, projections 7, 8, 9A, and 10A, may correspond to projections for providing position information regarding the cover 1A. As illustrated in the figure, these projections are respectively positioned at each of the four corners of the window 5 included in the cover 1A. Accordingly, in addition to performing processing for determining a misalignment of the cover 1A with respect to the terminal device 100 to which the cover 1A is attached, processing circuitry of the terminal device 100 may additionally determine a position and size of the window 5 based on detected coordinate positions of the projections 7, 8, 9A, and 10A. For example, the processing circuitry of the terminal device 100 may determine, based on a determination of the four corners corresponding to the four projections illustrated in FIG. 14, the size and the position of the window 5.

Next, in certain implementations, rather than the case where the number of projections included in a cover for position confirmation and a cover misalignment detection was previously illustrated in examples described herein as having four projections, in other implementations three projections may be sufficient for this determination. Moreover, although the raw material of the cover and the thickness of the cover were previously illustrated and discussed as relating to information regarding the change in touch sensitivity of a touch panel based on the position of projections on the terminal device cover, in certain implementations processing circuitry of the terminal device may directly determine a touch sensitivity based on a positional arrangement of the projections on the cover. For example, the terminal device may store a correspondence between one or more projection arrangements and a level of touch sensitivity corresponding to the projection arrangement, and when the processing circuitry determines a particular arrangement is included in the cover, the touch sensitivity of the terminal device touch panel may be directly adjusted based on this determination. For example, the touch sensitivity of a terminal device touch panel may be initially set to a standard level of zero. However, based on a positional arrangement determination of projections included on a cover attached to the terminal device, the processing circuitry of the terminal device may increase or decrease the touch sensitivity of the touch panel incrementally (e.g., +1, +2, −1, −2, etc.). Therefore, the processing circuitry of the terminal device can obtain the touch sensitivity of the corresponding cover based on the position of the projections directly without calculating a touch sensitivity based on this information relating to the cover, such as raw material and thickness of the cover. Moreover, in certain implementations, the processing circuitry may adjust the touch sensitivity of the touch panel by setting a portion of the touch panel other than a portion corresponding to the window of the cover as the portions of the touch panel for detecting touch operations.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The above disclosure also encompasses the embodiments noted below.

(1) A device comprising: a display configured to display an interface, wherein the display includes one or more touch sensors configured to detect a touch operation on an operating surface of the display; a cover attached to the device, wherein the cover includes one or more projections arranged on a surface of the cover that opposes the operating surface of the display when the cover is in a closed position; and circuitry configured to: determine when the cover is in an open position and the closed position; determine, based on an output generated by the one or more touch sensors, an arrangement position of the one or more projections; and control, when the cover is determined to be in the closed position, the display based on the determined arrangement position of the one or more projections.

(2) The device of (1), wherein the circuitry is further configured to determine, based on the arrangement position of the one or more projections, information related to the cover.

(3) The device of (1) or (2), wherein the circuitry is further configured to control the display based on the information related to the cover.

(4) The device of any one of (1) to (3), wherein the circuitry is further configured to control a detection sensitivity of the one or more touch sensors based on the information related to the cover.

(5) The device of any one of (1) to (4), wherein: the information related to the cover includes at least one of a thickness of the cover and a material of the cover, and the circuitry is further configured to control the detection sensitivity of the one or more touch sensors based on at least one of the thickness of the cover and the material of the cover.

(6) The device of any one of (1) to (5), wherein the circuitry is further configured to control one or more of a content, a size, a display location, and an arrangement of the interface based on the determined arrangement position of the one or more projections.

(7) The device of any one of (1) to (6), wherein the one or more touch sensors are included in the display at least at positions corresponding to one or more information confirming areas.

(8) The device of any one of (1) to (7), wherein the circuitry is further configured to control, when the cover is in the closed position, the display based on a relative position of the one or more projections within the one or more information confirming areas.

(9) The device of any one of (1) to (8), wherein: the one or more information confirming areas each respectively correspond to categories of the information related to the cover, the circuitry is further configured to determine the information related to the cover based on the relative position of the one or more projections within the one or more information confirming areas, and the circuitry is further configured to control the display based on the information related to the cover.

(10) The device of any one of (1) to (9), wherein the categories of information related to the cover include one or more of a color, a pattern, a window position, a window size, a material, a shape, and a thickness of the cover.

(11) The device of any one of (1) to (10), wherein the circuitry is further configured to: determine information related to a touch sensitivity of the one or more touch sensors based on the relative position of the one or more projections within the one or more information confirming areas, and control the detection sensitivity of the one or more touch sensors based on the information related to the touch sensitivity of the one or more touch sensors.

(12) The device of any one of (1) to (11), wherein: the information related to the touch sensitivity includes an indication value that indicates a setting level of the touch sensitivity, and the circuitry is further configured to control the touch sensitivity based on a magnitude of the indication value.

(13) The device of any one of (1) to (12), wherein: the cover includes a window through which the display is visible when the cover is in the closed position, and the circuitry is further configured to determine, based on the determined arrangement position of the one or more projections, a misalignment of the window with respect to a reference position of the operating surface of the display.

(14) The device of any one of (1) to (13), wherein the circuitry is further configured to control the display such that the displayed interface is corrected based on the misalignment.

(15) The device of any one of (1) to (14), wherein the correction of the displayed interface includes adjusting at least one of a display position and a display orientation of the interface.

(16) The device of any one of (1) to (15), wherein: the cover includes a window through which the display is visible when the cover is in the closed position, and the circuitry is configured to determine a size and a position of the window based on the determined arrangement position of the one or more projections.

(17) The device of any one of (1) to (16), wherein the circuitry is further configured to control the display such that a display size and a display position of the displayed interface corresponds to the size and the position of the window when the cover is in the closed position.

(18) A method of controlling a display included in a terminal device, wherein the display includes one or more touch sensors configured to detect a touch operation on an operating surface of the display, and wherein the terminal device includes a cover attached to the terminal device, the cover including one or more projections arranged on a surface of the cover that opposes the operating surface of the display when the cover is in a closed position, the method comprising: determining, by circuitry, when the cover is in an open position and the closed position; determining, by the circuitry, based on an output generated by the one or more touch sensors, an arrangement position of the one or more projections; and controlling, by the circuitry, when the cover is determined to be in the closed position, the display based on the determined arrangement position of the one or more projections.

(19) A non-transitory computer readable medium that, when executed by one or more processors, causes a terminal device to perform a method of controlling a display included in the terminal device, wherein the display includes one or more touch sensors configured to detect a touch operation on an operating surface of the display, and wherein the terminal device includes a cover attached to the terminal device, the cover including one or more projections arranged on a surface of the cover that opposes the operating surface of the display when the cover is in a closed position, the method comprising: determining when the cover is in an open position and the closed position; determining, based on an output generated by the one or more touch sensors, an arrangement position of the one or more projections; and controlling, when the cover is determined to be in the closed position, the display based on the determined arrangement position of the one or more projections.

(20) A cover apparatus comprising: a connection part that is connectable to a terminal device; a window through which a display included in the terminal device is visible when the cover is in a closed position and when the cover is connected to the terminal device; one or more projections arranged on a surface of the cover that opposes an operating surface of the display when the cover is in the closed position; a member that is detectable by circuitry included in the terminal device, wherein a detected presence of the member by the circuitry indicates the cover is in the closed position, wherein when the cover is in the closed position, an arrangement position of the one or more projections is detectable by the circuitry, and the arrangement position of the one or projections on the cover corresponds to information related to the cover such that when the arrangement position is determined by the circuitry, the circuitry is capable of determining, based on the arrangement position, the information related to the cover.

The invention claimed is:

1. A device comprising:
a display configured to display an interface, wherein the display includes one or more touch sensors configured to detect a touch operation on an operating surface of the display;
a cover attached to the device, wherein the cover includes a window through which the display is visible when the cover is in a closed position and one or more projections arranged on a surface of the cover that opposes the operating surface of the display when the cover is in the closed position; and
circuitry configured to:
  determine when the cover is in an open position and the closed position;
  determine, based on an output generated by the one or more touch sensors, an arrangement position of the one or more projections;
  control, when the cover is determined to be in the closed position, the display based on the determined arrangement position of the one or more projections;
  determine, based on a calculated deviation between determined arrangement positions of a subset of the one or more projections and a plurality of reference touch detection positions on the display, a misalignment of the window with respect to a reference position of the operating surface of the display; and
  control the display such that the displayed interface is corrected based on the misalignment.

2. The device of claim 1, wherein the circuitry is further configured to:
determine, based on the arrangement position of the one or more projections, information related to the cover; and
control the display based on the information related to the cover.

3. The device of claim 1, wherein the circuitry is further configured to:
determine, based on the arrangement position of the one or more projections, information related to the cover including at least one of a thickness of the cover and a material of the cover, and
control the detection sensitivity of the one or more touch sensors based on at least one of the thickness of the cover and the material of the cover.

4. The device of claim 1, wherein
the circuitry is further configured to control one or more of a content, a size, a display location, and an arrangement of the interface based on the determined arrangement position of the one or more projections.

5. The device of claim 1, wherein
the one or more touch sensors are included in the display at least at positions corresponding to one or more information confirming areas.

6. The device of claim 5, wherein
the circuitry is further configured to control, when the cover is in the closed position, the display based on a relative position of the one or more projections within the one or more information confirming areas.

7. The device of claim 6, wherein:
the one or more information confirming areas each respectively correspond to categories of the information related to the cover,
the circuitry is further configured to determine the information related to the cover based on the relative position of the one or more projections within the one or more information confirming areas, and
the circuitry is further configured to control the display based on the information related to the cover.

8. The device of claim 7, wherein
the categories of information related to the cover include one or more of a color, a pattern, a window position, a window size, a material, a shape, and a thickness of the cover.

9. The device of claim 6, wherein
the circuitry is further configured to:
    determine information related to a touch sensitivity of the one or more touch sensors based on the relative position of the one or more projections within the one or more information confirming areas, and
    control the detection sensitivity of the one or more touch sensors based on the information related to the touch sensitivity of the one or more touch sensors.

10. The device of claim 9, wherein:
the information related to the touch sensitivity includes an indication value that indicates a setting level of the touch sensitivity, and
the circuitry is further configured to control the touch sensitivity based on a magnitude of the indication value.

11. The device of claim 1, wherein
the correction of the displayed interface includes adjusting at least one of a display position and a display orientation of the interface.

12. The device of claim 1, wherein:
the circuitry is configured to determine a size and a position of the window based on the determined arrangement position of the one or more projections.

13. The device of claim 12, wherein
the circuitry is further configured to control the display such that a display size and a display position of the displayed interface corresponds to the size and the position of the window when the cover is in the closed position.

14. A method of controlling a display included in a terminal device, wherein the display includes one or more touch sensors configured to detect a touch operation on an operating surface of the display, and wherein the terminal device includes a cover attached to the terminal device, the cover including a window through which the display is visible when the cover is in a closed position and one or more projections arranged on a surface of the cover that opposes the operating surface of the display when the cover is in the closed position, the method comprising:
    determining, by circuitry, when the cover is in an open position and the closed position;
    determining, by the circuitry, based on an output generated by the one or more touch sensors, an arrangement position of the one or more projections;
    controlling, by the circuitry, when the cover is determined to be in the closed position, the display based on the determined arrangement position of the one or more projections;
    determining, by the circuitry, based on a calculated deviation between determined arrangement positions of a subset of the one or more projections and a plurality of reference touch detection positions on the display, a misalignment of the window with respect to a reference position of the operating surface of the display; and
    controlling, by the circuitry, the display such that a position of a displayed interface is corrected based on the misalignment.

15. A non-transitory computer readable medium that, when executed by one or more processors, causes a terminal device to perform a method of controlling a display included in the terminal device, wherein the display includes one or more touch sensors configured to detect a touch operation on an operating surface of the display, and wherein the terminal device includes a cover attached to the terminal device, the cover including a window through which the display is visible when the cover is in a closed position and one or more projections arranged on a surface of the cover that opposes the operating surface of the display when the cover is in the closed position, the method comprising:
    determining when the cover is in an open position and the closed position;
    determining, based on an output generated by the one or more touch sensors, an arrangement position of the one or more projections;
    controlling, when the cover is determined to be in the closed position, the display based on the determined arrangement position of the one or more projections;
    determine, based on a calculated deviation between determined arrangement positions of a subset of the one or more projections and a plurality of reference touch detection positions on the display, a misalignment of the window with respect to a reference position of the operating surface of the display; and
    controlling, by the circuitry, the display such that a position of a displayed interface is corrected based on the misalignment.

16. The device of claim 1, further comprising:
a touch driver, wherein
the circuitry is configured to:
    determine, based on the arrangement position of the one or more projections, information related to the cover; and
    control the touch driver to change a detection sensitivity of the one or more touch sensors based on the information related to the cover.

17. The device of claim 16, wherein
the information related to the cover includes information indicating thickness of the cover, and
circuitry is configured to control the touch driver to change the detection sensitivity of the one or more touch sensors to increase the detection sensitivity of the one or more touch sensors proportionally to an increasing thickness of the cover.

18. The device of claim 16, wherein
the information related to the cover includes information indicating a permeability of a material of which the cover is composed, and
circuitry is configured to control the touch driver to change the detection sensitivity of the one or more touch sensors to increase the touch sensitivity of the one or more touch sensors inversely proportional to a decrease in permeability of the material of which the cover is composed.

* * * * *